Nov. 6, 1934.  P. S. RYDBECK  1,979,707
ROLLER BUSHING
Filed Oct. 6, 1933
Fig.1.
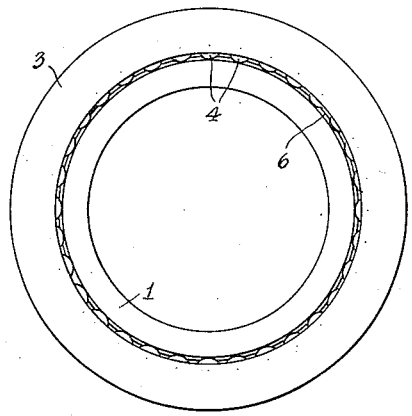
Fig.2.
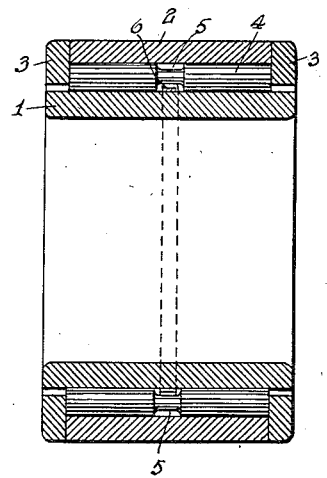
Fig.3.
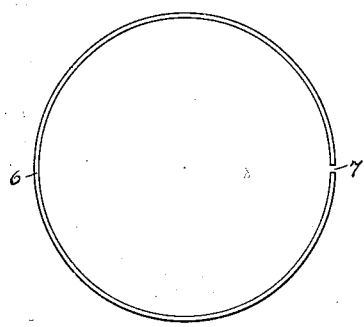
Fig.4.
Fig.5.
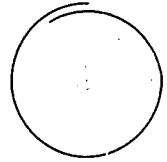
INVENTOR
PATRIK SAMUEL RYDBECK
BY
ATTORNEY Patented Nov. 6, 1934

1,979,707

UNITED STATES PATENT OFFICE 1,979,707

ROLLER BUSHING

Patrik Samuel Rydbeck, Gottenborg, Sweden, assignor to Aktiebolaget Svenska Kullagerfabriken, Gottenborg, Sweden, a corporation of Sweden Application October 6, 1933, Serial No. 692,375
In Sweden May 12, 1933

1 Claim. (Cl. 308—212)

Roller bushings or roller bearings having comparatively long rollers which are not provided with a cage to separate the rollers and hold the rollers together, when the bearing is taken apart, are in some cases provided with a ring located concentric with the inner and outer bearing members in suitable grooves in the rollers, the said ring serving to retain the rollers in contact with one of the bearing members, when the other bearing member is removed. Because of the very limited space available for this ring the design of a suitable ring meets with considerable difficulty. A ring turned or rolled in one piece is expensive to manufacture and because of its small cross sectional area and large diameter almost impossible to harden. It is also impracticable to use a band bent to a ring and welded together at the ends, because this method cannot be used with materials suitable for rings of this kind. The dimensions of the ring are also too small to permit of a rivet or screw joint.

This invention presents a solution to this problem which meets all requirements with respect to a cheap and reliable device and is characterized mainly in that the ring is formed of a band or wire having free ends, the said band resiliently engaging the rollers.

The invention is illustrated on the accompanying drawing in which

Figure 1 shows an end view of a roller bushing according to one form of the invention;

Fig. 2 is a cross section in an axial plane of the same roller bushing;

Fig. 3 shows a retainer ring in the form it assumes when mounted in the bushing;

Fig. 4 shows one form assumed by the ring before being assembled in a roller bushing of the type is shown in Figs. 1 and 2, and Fig. 5 shows the form before assembling of a ring designed for use in a roller bushing, in which the ring is located outside the rollers.

In Figs. 1 and 2 the numeral 1 designates the inner bearing member, 2 the outer bearing member and 3 flanges disposed at the ends of the outer bearing member for axially fixing the rollers 4. The rollers are provided with grooves 5. A ring 6 having the form of a band is located in these grooves concentric with the race of the inner bearing member 1. Fig. 3 shows the band as having assumed this circular form. The ends of the band abut at 7. In some cases there may be a small clearance between the ends, which are entirely free of each other. In a roller bushing of the type illustrated in Figs. 1 and 2 the rollers should be retained in the outer race, when the inner bearing member is removed. The retainer ring 6 is, therefore, located inwardly of the roller set and because of its elasticity exerts a slight pressure outwardly against the rollers. The ring 6 may, therefore, advantageously be made of suitably hardened steel. Before being assembled in the bearing the band may have the form shown in Fig. 4, i. e. the greater part of the band is straight or only slightly curved, while both ends are bent to the curvature which the entire band is constrained to assume when assembled in the bearing. By forming the ends in this manner they are prevented from pressing against the rollers with greater force than other portions of the band and are also prevented from striking the rollers as the latter pass over the joint in the ring.

If it is required to retain the rollers on the inner race, when the bearing is taken apart, the retainer ring is located outside the rollers. In such cases the ring should have the initial form shown in Fig. 5, i. e. it should be formed with a diameter less than that which it will assume in the assembled bearing. In this case also the ends should be given the same curvature as assumed when assembled.

The invention can naturally be carried out in a number of different ways. The rollers may each be provided with two or more grooves with one or more rings in each groove. The rings may be located both inwardly and outwardly of the rollers to retain the rollers, no matter which of the bearing members is removed. The set of rollers will then also be self-contained to a certain extent, when both bearing members are removed.

Having thus described my invention I claim and desire to secure by Letters Patent:

A roller bushing having an inner and an outer bearing member, cylindrical rollers disposed between the bearing members, the said rollers being provided with circumferential grooves and a retainer ring formed of resilient material and located in these grooves concentric with the bearing members, the ring being formed of a band of wire having free ends initially formed to the same curvature as that assumed by the band when assembled in the roller bushing and being located in position to engage the rollers at one side and resiliently urge them toward the bearing member at the other side.

PATRIK SAMUEL RYDBECK.